US010078912B1

(12) United States Patent
Kanthasamy et al.

(10) Patent No.: US 10,078,912 B1
(45) Date of Patent: Sep. 18, 2018

(54) MESH COMPONENT DESIGN FOR FINITE ELEMENT METHODS AND SYSTEMS

(71) Applicant: MSC.Software Corporation, Santa Ana, CA (US)

(72) Inventors: Kunaseelan Kanthasamy, Irvine, CA (US); Gongdao Chen, Irvine, CA (US)

(73) Assignee: MSC.Software Corporation, Newport Beach, CA (US)

( * ) Notice: Subject to any disclaimer, the term of this patent is extended or adjusted under 35 U.S.C. 154(b) by 318 days.

(21) Appl. No.: 13/678,469

(22) Filed: Nov. 15, 2012

(51) Int. Cl.
| | |
|---|---|
| *G06T 17/20* | (2006.01) |
| *G06T 15/04* | (2011.01) |
| *G06T 15/60* | (2006.01) |
| *G06T 15/50* | (2011.01) |
| *G06T 19/00* | (2011.01) |
| *G06T 17/10* | (2006.01) |
| *G06T 15/80* | (2011.01) |
| *G06T 11/00* | (2006.01) |

(52) U.S. Cl.
CPC .............. *G06T 17/20* (2013.01); *G06T 15/04* (2013.01); *G06T 15/503* (2013.01); *G06T 15/60* (2013.01); *G06T 19/00* (2013.01); *G06T 11/001* (2013.01); *G06T 15/80* (2013.01); *G06T 17/10* (2013.01)

(58) Field of Classification Search
CPC ........ G06T 17/20; G06T 17/205; G06T 15/04
See application file for complete search history.

(56) References Cited

U.S. PATENT DOCUMENTS

| | | | | |
|---|---|---|---|---|
| 4,933,889 A | * | 6/1990 | Meshkat et al. | ................... 703/2 |
| 7,339,584 B1 | * | 3/2008 | Shepherd | ................ G06T 17/20 |
| | | | | 345/419 |
| 2003/0122821 A1 | * | 7/2003 | Politis | ..................... G06T 15/40 |
| | | | | 345/421 |
| 2009/0052760 A1 | * | 2/2009 | Smith et al. | .................. 382/132 |
| 2011/0310101 A1 | * | 12/2011 | Prange | .................. G01V 99/00 |
| | | | | 345/420 |

OTHER PUBLICATIONS

"Geometric Modeling Based on Polygonal Meshes", These notes supplement the full day SIGGRAPH 2007 course "Geometric Modeling Based on Polygonal Meshes", Mario Botsch & Mark Pauly with Leif Kobbelt, Pierre Alliez, and Bruno L'evy May 2007.*

An automatic 3D mesh generation method for domains with multiple materials Comput. Methods Appl. Mech. Engg. 199 (2010) 405-415 by Zhang et al.*

Removing Self Intersections of a Triangular Mesh by Edge Swapping, Edge Hammering, and Face Lifting.; Proceedings, 18th International Meshing Roundtable, Springer-Verlag, pp. 13-29, Oct. 25-28, 2009 by Yamakawa et al.*

(Continued)

*Primary Examiner* — Saptarshi Mazumder
(74) *Attorney, Agent, or Firm* — Foley & Lardner LLP

(57) ABSTRACT

One embodiment relates to a method for detecting self-contact in a simulated object. The method includes detecting contact region within a simulated model, classifying the contact region in the model. The method further includes fixing the contact region by at least one of moving a node in the model, local modification and Boolean operation and creating a tetrahedral mesh after fixing the contact region.

21 Claims, 12 Drawing Sheets

(56) References Cited

OTHER PUBLICATIONS ("Projections and distances" Last modified: Fri Jan. 16 10:09:13 EST 2004 © 2004 Gavin LaRose, UM Math Dept. http://www.math.lsa.umich.edu/~glarose/classes/calcIII/web/13_5/ by LaRose.*
Meshlab: An open Source Mesh Processing Tool, Eurographics Italian Chapter Conference (2008), Cignoni et al.*
"General Mesh Viewer User's manual" version 4.5, Jul. 2008, www.generalmeshviewer.com/doc.color.pdf Jul. 2008 by Orgeta.*
"Simplification Envelopes", Proceedings ACM SIGGRAPH Aug. 4-9, 1996, New Orleans LA, pp. 1190128 by Cohen et al.*
"Collision and self-collision detection", D. Terrzioulos et al. (eds), pp. 56-65; Computer Animation and simulation '95 @Springer Verklag/Wien 1995 by Volino et al.*

* cited by examiner

MESH COMPONENT DESIGN FOR FINITE ELEMENT METHODS AND SYSTEMS

BACKGROUND

The present disclosure generally relates to the field of finite element method systems. The present disclosure relates more specifically to self-intersection and self-contact occurrences in a design created or modified in a finite element method system.

Predicting behavior or mechanical objects is important in order to assess the operability of the mechanical objects over time. Typically, the predicted behavior is done by way of computer simulations of the mechanical object.

One such way of predicting behavior of mechanical objects is by using a finite element method, which is used to predict the behavior of one or more physical objects in a virtual environment. The finite element method may involve several steps. The finite element method may include creation of a finite element model, which may typically be a geometry design imported from a finite element method (FEM) system. The FEM system may generally be configured to allow for design of any type of three-dimensional object that a user might want to manufacture or display.

The finite element method may further include enhancement of the finite element model with material, property, load, and constraint attributes. The attributed finite element model may be transformed into a formatted file suitable for consumption by a finite element solver. The information contained within the formatted solver files may be used to generate a set of equations and subsequent solutions of the equations by the finite element solver. The results may then be processed.

In general, the process of creating a finite element model and transforming the model and attributes may result in errors. For example, one such error may occur when the model has one or more self-contact or self-intersection instances. For example, two different portions of the model may, during design, be in contact with or intersect one another. Sometimes, the finite element method may fail to deal with self-contact and self-intersection instances. It is desirable to come up with a way to create a valid mesh for the model even if the finite element solver produces a mesh with self-contacting and self-intersecting instances. In such a system, it is desirable to preserve the continuity of the finite element method starting with the creation of the original model through the study and analysis of the model by the finite element solver.

SUMMARY

One embodiment relates to a method for detecting self-contact in a simulated object. The method includes detecting contact region within a simulated model, classifying the contact region in the model. The method further includes fixing the contact region by at least one of moving a node in the model, local modification and Boolean operation and creating a tetrahedral mesh after fixing the contact region.

Another embodiment relates to detecting the contact region that includes building an octree data structure and inserting mesh information into the octree data structure. The contact detection can include detecting the intersecting triangle pairs, identifying properties of the intersection triangle pairs, calculating, for each intersecting triangle pair, triangle normal and triangle vertex distance, and organizing the triangle pairs.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Figure 1:
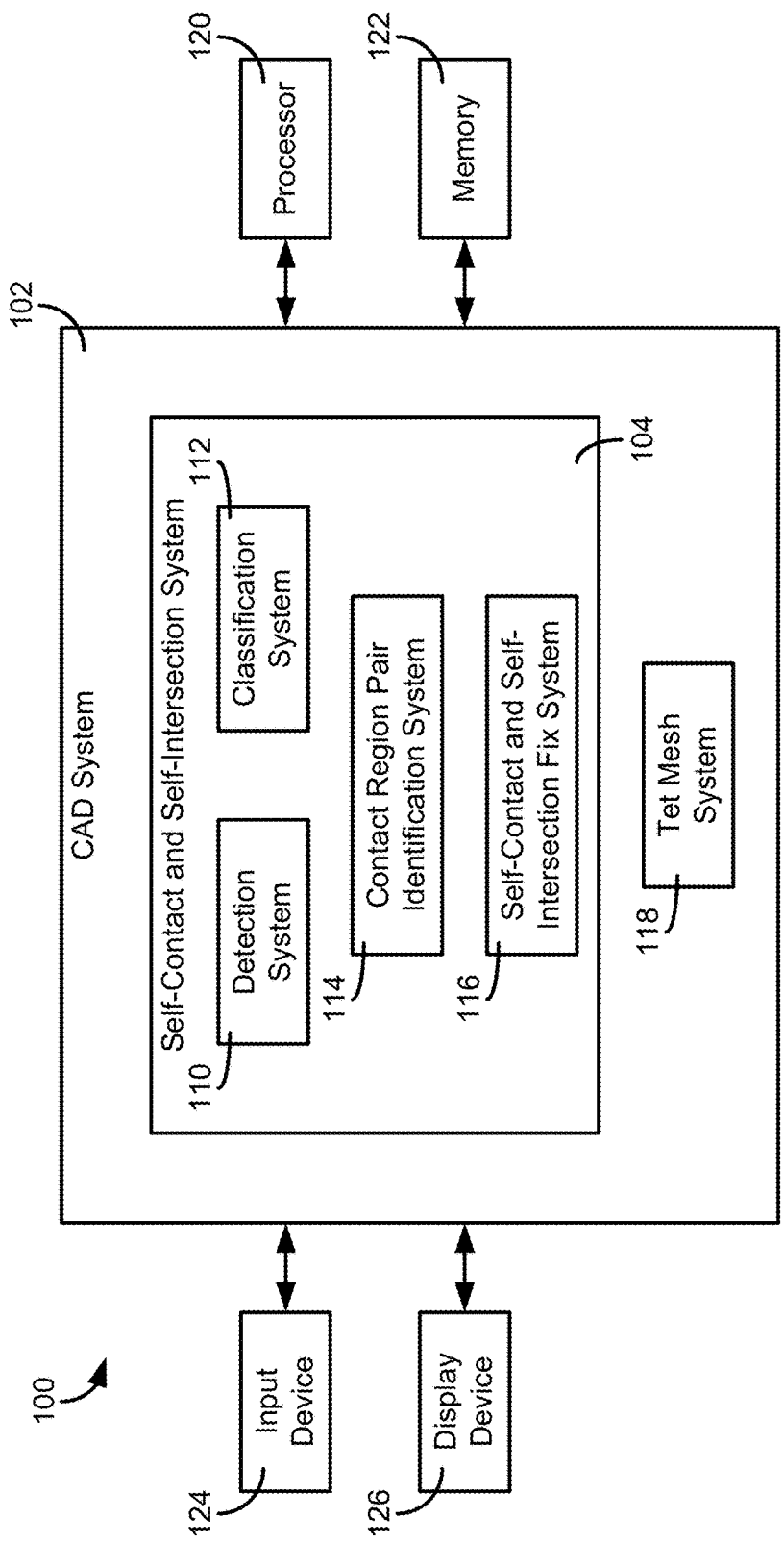
FIG. 1 is a block diagram of a data processing system including a FEM system for use with the systems and methods of the present disclosure, according to an exemplary embodiment.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Referring generally to the figures, a finite element method is shown and described. More particularly, systems and methods for mesh component design in a FEM system as part of the finite element method are shown and described. The systems and methods may be used to create, optimize, test, and deploy a three-dimensional solid model in a FEM system.

During creation and optimization of the model, there may be self-contacting and self-intersecting meshes in the model. For example, two different portions of the model may, during design, be in contact with or intersect one another. If there are self-contact and self-intersection meshes or instances in the model, there may be a failure of the FEM system when attempting to create a tet mesh (e.g., tetrahedral mesh) of the model. In other words, when self-contact and self-intersection meshes are present, the model may encounter errors in the finite element method. Referring to the present disclosure, systems and methods for identifying and fixing self-contact and self-intersection meshes are shown and described.

The systems and methods for identifying and fixing self-contact and self-intersection meshes in a model may generally include a detection step (detecting self-contact and self-intersection or penetration instances), a classification step (classifying each instance), a fixing step (removing such instances from the model), a tet meshing step, and a contact area recovery step.

In the systems and methods described herein, the self-contact and self-intersection problem is treated not just as individual points or triangles intersecting in a model, but also as whole connected contact regions intersecting (e.g., whole regions of the meshes intersecting with one another) in the model. Intersection data may be gathered for each pair of intersecting triangles such that connections (e.g., self-contact and self-intersection instances) between the intersecting triangles may be found. These connections may be used to group intersecting triangles into a contact region.

Intersecting triangle pairs may be organized as a contact region pair. Each triangle in a contact region is either intersecting with a triangle in the other contact region in the contact region pair or is completely inside the other contact region in the contact region pair.

Moving a node in a contact region may affect the adjacent nodes in the contact region. Therefore, the move vector of the nodes in a contact region may be adjusted based on the move vectors of adjacent nodes in the contact region.

In the case of a triangle completely inside a volume of another contact region, but where the triangle does not intersect with other non-adjacent triangle, an intersection check may not detect this scenario. However, by analyzing the entire contact region, this type of intersection problem can then be detected.

The move vector of a node in a contact region contains the calculated data of the moving direction and moving distance of the node. The move vector allows for fixing of self-contact and self-intersection instances in multiple iterations. After an iteration of a self-contact or self-intersection fix, if there is still an intersection present, the move vector may be adjusted and the node moved again. The move vector is also used in the contact area recovery step.

In the case of self-intersection in a model, if part of a contact region is more than two element layers deep inside the other contact region in the contact region pair, a Boolean operation as described in the present disclosure may be used to fix the self-intersection instead of using a move node method.

Figure 3A:
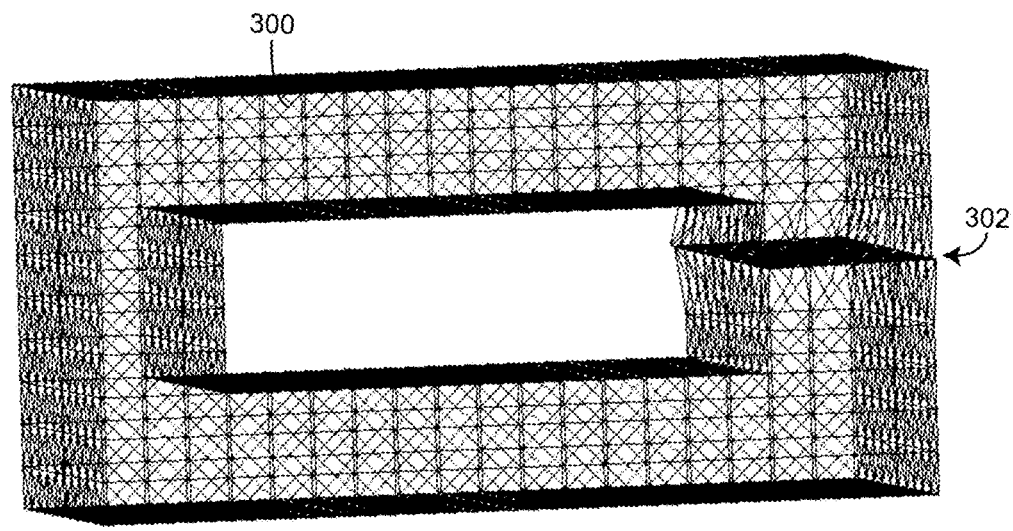
FIGS. 3A-B illustrate an example self-contact instance in a model, according to an exemplary embodiment.
Figure 3B:
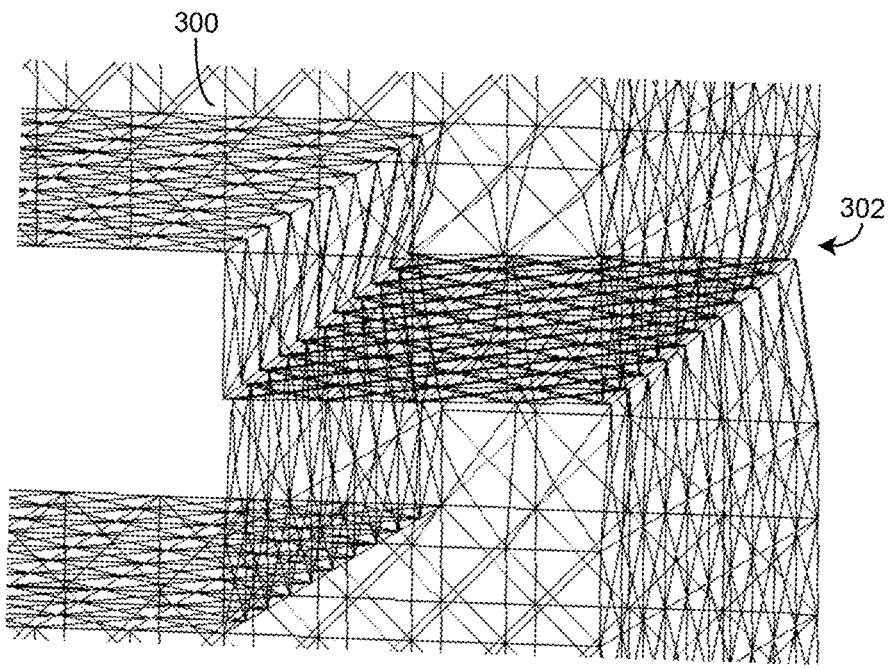
Figure 4A:
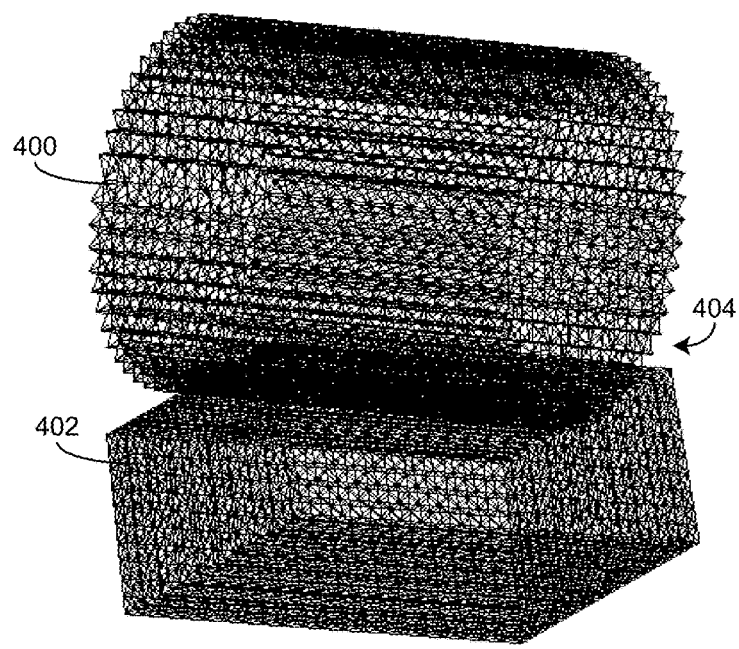
FIGS. 4A-B illustrate an example self-intersection instance in a model, according to an exemplary embodiment.
Figure 4B:
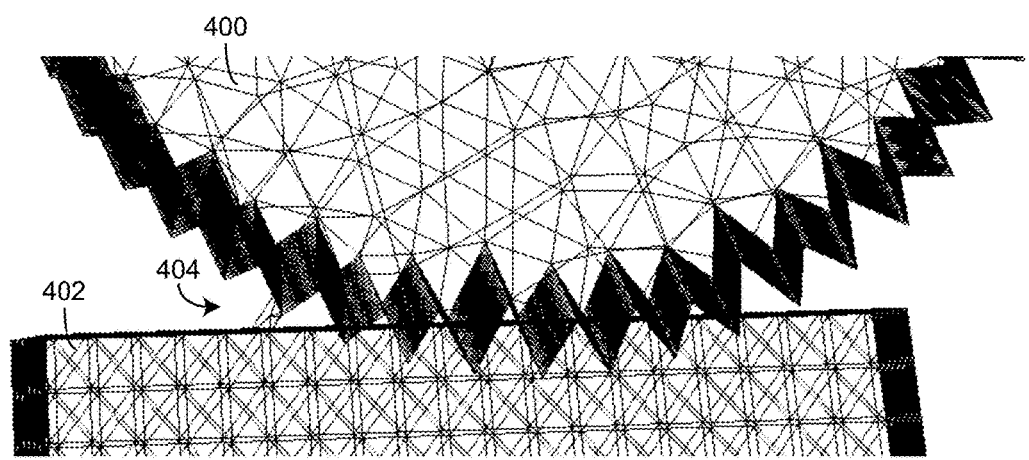

As an example, referring generally to FIGS. 3A-4B, examples of self-contact and self-intersection are shown with respect to a pair of models. FIGS. 3A-4B illustrate a model with a tri-mesh body (e.g., a model composed of triangles connected to one another via the vertices, edges, and surfaces of the triangles). FIGS. 3A-B illustrate a self-contact instance 302 in a model 300, and FIGS. 4A-B illustrate a self-intersection instance 404 in a model with two portions 400, 402. These examples will be described in greater detail below. While the embodiments in the present disclosure illustrate self-contact and self-intersections instances in a tri-mesh body, it should be understood that the systems and methods described herein are not restricted to the example shapes and geometry shown in the figures or described in the specification.

Referring to FIG. 1, a block diagram of a data processing system 100 is shown according to an exemplary embodiment. System 100 includes a FEM system 102 generally configured to execute the systems and methods described herein. System 100 further includes a processor 120, memory 122, an input device 124, and a display device 126. System 100 may include other devices such as a network system, wireless or wired communications systems, printers, and other electronic devices.

Input device 124 may be or include a computer with a monitor, keyboard, keypad, mouse, joystick, or other input devices performing a similar function. Input device 124 may include a keyboard including alphanumeric and other keys, and may be connected to FEM system 102 for communicating information and command selections to processor 120. Input device 124 may include a touch screen interface or movement sensing interface that may be combined with, or separated from, display device 126. Input device 124 may include a cursor control device, such as a mouse, trackball, touch screen, motion sensor, or cursor direction keys, for communicating direction information and command selections to processor 120 and for controlling cursor movement on display device 126. Display device 126 may be any type of display (e.g., CRT display, LCD display, etc.) configured to provide a visual output to a user of FEM system 102 and data processing system 100.

FEM system 102 may be a computer system in communication with processor 120, memory 122, input device 124, and display device 126. In one implementation, FEM system 102 may be stored on a non-transitory storage medium that is at the same location as input device 124. In another implementation, FEM system 102 may be located in a different location than input device 124. For example, FEM system 102 may communicate with input device 123 through a network or wirelessly. Accordingly, FEM system 102 may be a cloud-based system that provides software as a service. In another embodiment, FEM system 102 may include processor 120 and memory 122.

Processor 120 may be configured to receive instructions from input device 124 and FEM system 102. For example, the instructions may request processor 120 to calculate the distance between two edges, the area of a resulting shape, snap tolerances and constraints for the vertices, edges and surfaces, or any other type of general command or request related to the finite element method. Processor 120 is configured to receive data from and calculate results for each of the systems and logics within FEM system 102. Processor 120 may be, but is not limited to being, an Intel® designed processor, AMD® designed processor, Apple® designed processor, QUALCOMM® designed processor, or ARM® designed process.

Memory (or storage device) 122 may include a memory such as a random access memory (RAM) or other dynamic storage devices. In another implementation, memory 122 may also include non-transitory storage media that is configured to store information regarding a geometric model that is being currently modified or was created in the past. Memory 122 may send or receive data to or from processor 120 and each of the other systems in system 100. For example, memory 122 may be configured to communicate with input device 124, FEM system 102 and display device 126. In one embodiment, memory 122 may be a remote storage device that stores FEM system 102 data in a different location than input device 124 or FEM system 102. In another embodiment, memory 122 may be located on the same computer system as input device 124 and/or FEM system 102.

Referring more specifically to FEM system 102, various systems are included that may be executed by process 120. FEM system 102 may be generally configured to execute the finite element method described herein. FEM system 102 is shown to generally include a self-contact and self-intersection system 104 configured to detect, categorize, and fix self-contact and self-intersection meshes in a model being designed by a user. It should be understood that while FEM system 102 mainly illustrates system 104, FEM system 102 may further include any number of other systems configured to manage the finite element method as generally described in the present disclosure. While the present disclosure described a FEM system, it should be understood that FEM system 102 may alternatively be a computer-adied design (CAD) system, computer-aided engineering (CAE) system, or any other type of similar system in which a user may perform engineering tasks or create designs via computer software.

FEM system 102 is shown to include a self-contact and self-intersection system 104. System 104 may generally be a system configured to detect and fix self-contact and self-intersection instances in a mesh of a model being designed by a user of FEM system 102. A self-contact or self-intersection instance may generally be defined as an instance where two portions of a mesh of a model intersect or touch one another. One example of a mesh of a model is a tri-mesh, which is composed of a set of triangles that are connected to other triangles by common edges or vertices. In such a mesh, a self-contact or self-intersection may occur when a vertex, edge, or surface of a triangle touches or intersects with a vertex, edge, or surface of another triangle of the mesh.

System 104 generally includes a detection system 110, classification system 112, contact-region pair identification system 114, and a self-contact and self-intersection fix system 116. System 110 may be configured to detect self-contacting and self-intersecting instances. Classification system 112 may be configured to classify each instance. Contact-region pair identification system 114 may be configured to determine actual locations of self-contact and self-intersection based on the classification. Fix system 116 may then be configured to fix the self-contact and self-intersection instances.

System 104 is shown to include a detection system 110. Detection system 110 may be configured to detect instances of self-contacting and self-intersecting in a model.

Detection system 110 may use various techniques or data structures in the detection process. In one embodiment, detection system 110 may be configured to build an octree data structure and to insert all triangles of the mesh of the model into the octree. An octree is a tree data structure in which each node of the tree has exactly eight children or sub-nodes. Octrees may be used to partition a three-dimensional space (e.g., the three-dimensional model being designed) by recursively subdividing the model into eight octants. For example, if the model is a cube, using an octree data structure, the cube can be divided into eight equal parts, and each part may be stored as a child node of the main node representing the cube. In the octree data structure, each node may be represented by a point (e.g., a center point) indicating a location of the mesh portion represented by the node, or may be represented by other mesh information.

The use of an octree data structure in the present disclosure may reduce the number of pairs or data points in the model that need to be checked for self-contact and self-intersecting instances. After formation of the octree data structure, detection system 110 may, for each triangle in the octree, check if the triangle intersects with triangles that are in the same cell of the octree or in the adjacent cells of the octree (e.g., triangles sharing a parent node). If triangles do intersect, then detection system 110 may determine that a self-contact or self-intersection instance exists in the mesh. Detection system 110 may then determine triangle information (e.g., location of vertices and edges, location of the intersection, etc.) and sort the triangle information in a list for use by other subsystems of system 104. The triangle information may generally include intersection information (e.g., specific intersection points or regions of the triangles), triangle position information, and other relevant information.

Figure 5:
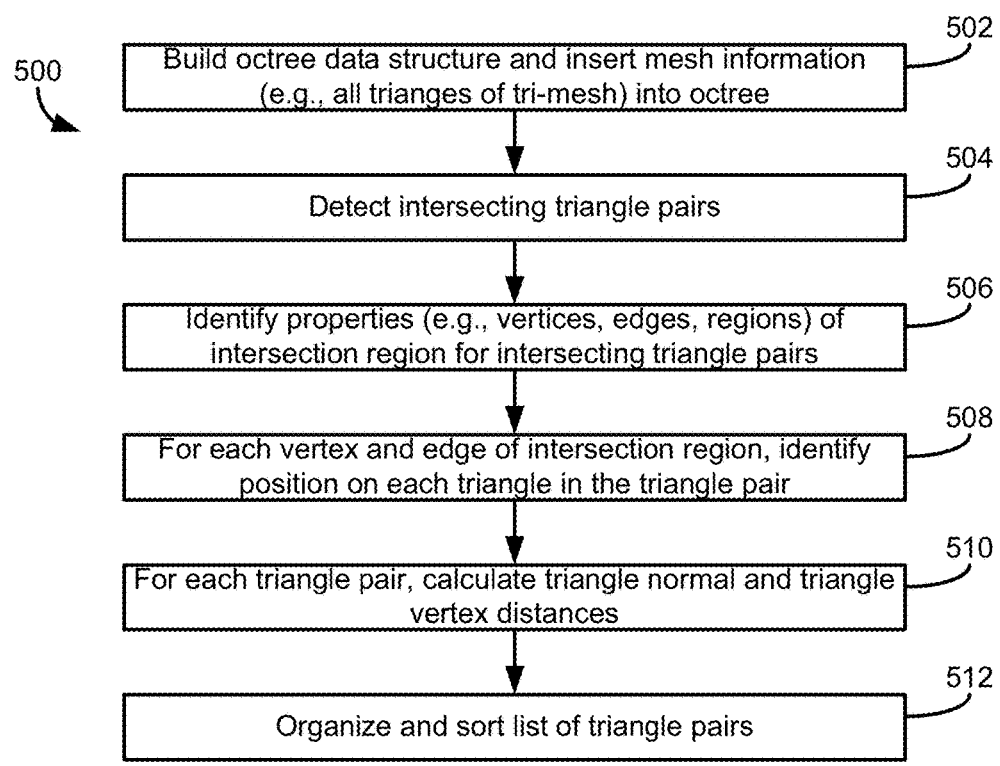
FIG. 5 is a detailed flow chart of a process for using an octree data structure in a self-contact and self-intersection detection step, according to an exemplary embodiment.
Figure 6:
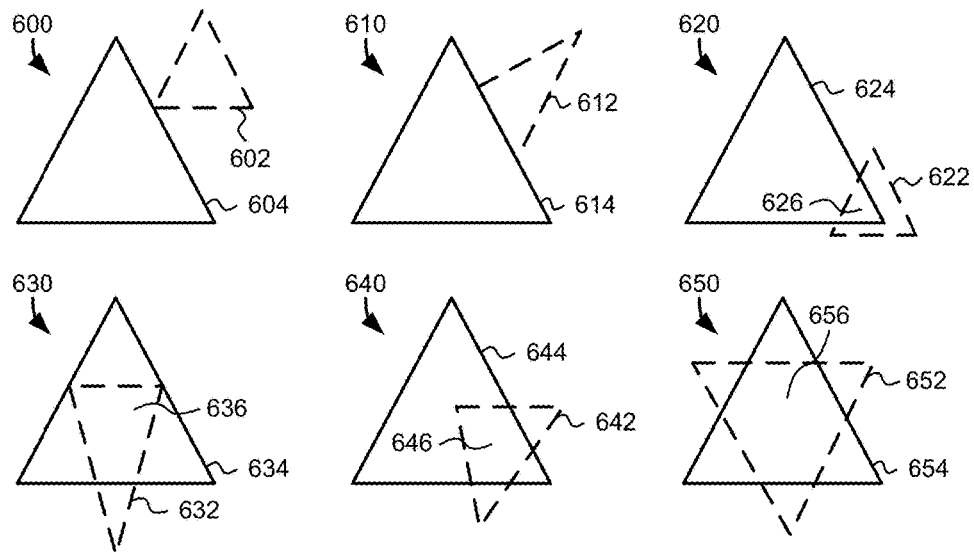
FIG. 6 illustrates various classifications of self-contact or self-intersection instances that may occur in a model, according to an exemplary embodiment.

While the use of an octree data structure is described in the present disclosure, it should be understood that other data structures may be used to store mesh and model information for use by the systems and methods described herein. The activities of detection system 110 are shown in greater detail in FIGS. 5-6. More particularly, FIG. 5 is a flow chat of a more detailed detection process that includes details about identification of information regarding each detected instance. FIG. 6 illustrates various types of intersections for which the process of FIG. 5 may be configured to detect.

System 104 further includes a classification system 112. After detection system 110 determines self-contacting and self-intersecting meshes in the model, classification system 112 may be configured to receive the list of meshes and to classify each such case. The classifications provided by classification system 112 may then be used by other subsystems of system 104. For example, fix system 116 may determine the type of fix to apply to a self-contacting or self-intersecting instances based on the classification of the instance by classification system 112.

There may be various examples of self-contact or self-intersection that may be defined by classification system 112. For example, the self-intersection may be a point contact. In a point contact scenario, the intersection region of two triangles may be a single point. In the point contact scenario, there may be several sub-cases based on the position of the intersection point in each triangle. One example is when the intersecting point may be at a vertex of both of the triangles. Another example is when the intersecting point may be a vertex at a first triangle and at an interior point on an edge of the second triangle. Yet another example is when the intersecting point may be a vertex of a first triangle and at an interior point of the other triangle (e.g., not a vertex or on an edge). Yet another example is when the intersecting point is an interior point of an edge of a first triangle and an interior point of an edge on the second triangle. Yet other scenarios are possible.

Another example of a self-contact or self-intersection may be an edge contact. In an edge contact scenario, the intersection region of the two triangles is a line segment. In the edge contact scenario, there may be several sub-cases based on the position of the line segment in each triangle. One example is when the line segment is an edge of both triangles. Another example is when the line segment is an edge of a first triangle and a boundary segment (e.g., a portion of the edge of a triangle) of the second triangle. Yet another example is when the line segment is an edge of a first triangle and an interior segment of the second triangle. Other examples of line segment intersections may include when boundary segments of two triangles intersect, when interior segments of two triangles intersect, or when a boundary segment of one triangle intersects with an interior segment of the other triangle.

Figure 7:
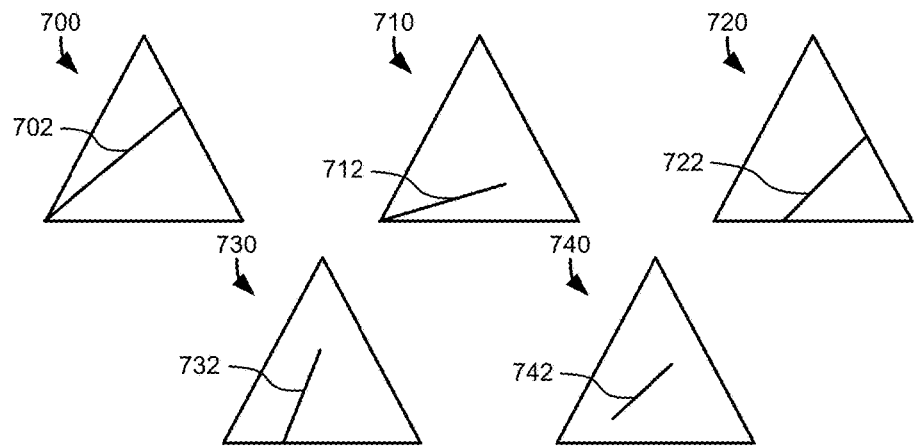
FIG. 7 illustrates various types of interior segments of an edge contact intersection instance in a model, according to an exemplary embodiment.

An interior segment of a triangle may be a line segment in the interior of the triangle in which all points on the interior segment are interior points on the triangle. The end points of the interior segment may be vertices of the triangle, interior points of a boundary edge of the triangle, interior points of the triangle, or any combination thereof. Referring also to FIG. 7, various examples of interior segments in an edge contact scenario are shown in greater detail.

Another example of a self-contact or self-intersection may be an area contact. In an area contact scenario, the intersection region of the two triangles is a polygon (e.g., a two-dimensional area). In the area contact scenario, there may be several sub-cases based on the shape (e.g., number of edges) of the polygon. For example, the region may be identified as a triangle, quadrilateral, pentagon, hexagon, or any other type of polygon.

Another example of a self-contact or self-intersection may be an inside contact scenario. In the inside contact scenario, one triangle may be completely inside of the other triangle (e.g., all vertices of one triangle are inside the area of the second triangle). Another example scenario may be a coincident contact scenario, where the two triangles are coincident (e.g., both triangles occupy the same area, edges, vertices, etc.). Another example scenario may be a coplanar contact scenario, where the two triangles are coplanar (e.g., both objects lie in the same plane). Another example scenario may be a penetration scenario, where one triangle lies on both sides of the other triangle. Yet other scenarios are possible.

Figure 8:
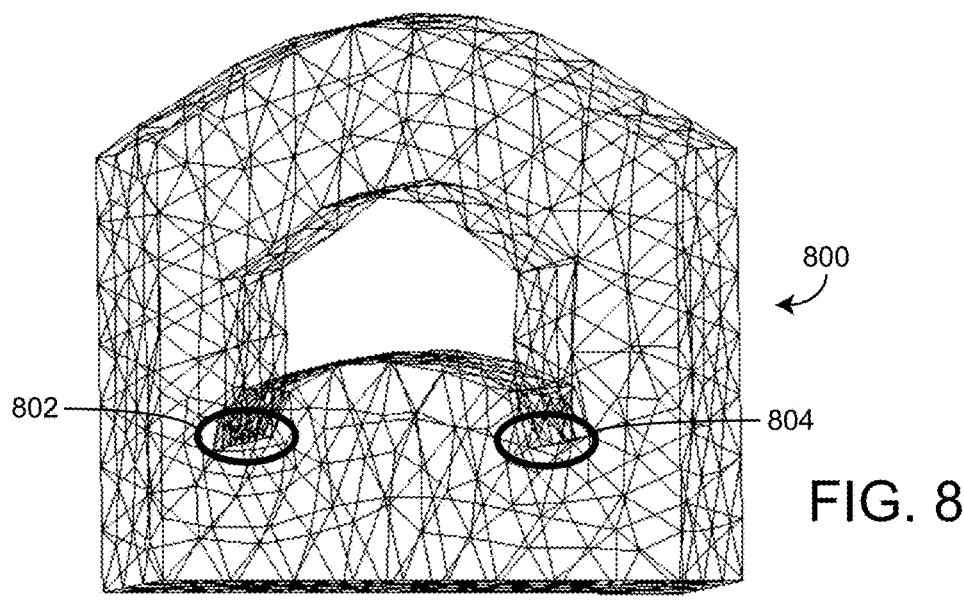
FIG. 8 illustrates a folded contact example of a self-contact instance in a model, according to an exemplary embodiment.

Another example may be a folded contact scenario. Referring also to FIG. 8, a folded contact scenario may occur when the two triangles share a common vertex or common edge, and the two triangles are parallel to one another, and have an opposite normal. In model 800 of FIG. 8, two areas 802, 804 are highlighted that indicate possible folded contact areas of model 800.

System 104 further includes a contact region pair identification system 114. Contact region pair identification system 114 may be configured to identify contact region pairs on the mesh of the model based on the classification of the self-contact or self-intersection instance in the model. Contact region pair identification system 114 may be used to detect self-contact and self-intersection instances that may not be possible to detect via detection system 110 (e.g., instances where a triangle is completely inside a volume of an area in the model but does not intersect with other triangles cannot be detected by detection system 110, but can be detected by identification system 114).

The identification of a contact-region pair may include determining the inside and outside status of nodes at each intersecting triangle pair. In each such pair, it is desirable to know if a node in a triangle is inside or outside of the volume. In other words, it is desirable to know whether a node of a triangle of the contact region in the contact region pair is inside or outside a portion of the volume bounded by the other contact region of the contact region pair. If a node of a triangle is inside of that volume (e.g., the triangle is in the interior of the other contact region of the contact region pair), it means that there is an intersection present in the mesh. Such triangles may not intersect with other triangles in the mesh, but they may need to be "fixed" (e.g., moved) to remove a self-intersection instance in the mesh. Self-contact and self-intersection fixes may then be applied as described in the present disclosure. These fixes are applied to a tri-mesh in the model in a closed area that encloses the volume.

For each self-contact or self-intersection instance found by detection system 110, the boundary edges of the intersection area of the triangle pair may be connected. This may form a closed loop of contact regions in the triangle pair. These contact regions are then used as a contact region pair by fix system 116.

For each self-contact or self-intersection instance found by detection system 110, triangles that are adjacent to the instance may be searched for. Triangles that are inside the volume of the instance (e.g., triangles inside a volume that is formed by taking the volume of an area of the model impacted by the self-contact or self-intersection instance) may be connected to form a contact region pair. The contact region pair may then be used by fix system 116.

System 104 further includes a self-contact and self-intersection fix system 116. Fix system 116 may be configured to fix self-contact and self-intersection instances in the mesh of the model such that the model can tested and deployed in the finite element method. Fix system 116 may fix such instances using one or more of three processes: a move node process configured to move one or more nodes in one or more triangles of each instance, a local modification process configured to modify one or more edges of one or more triangles of each instance, and a Boolean operation process configured to modify contact region pairs associated with the instances. Fix system 116 may receive triangle pair information from classification system 112 and contact region pair information from identification system 114.

The move node process may generally include calculating a move vector for the node. The move vector may simply represent the movement of the node in the mesh of the model, where the movement should be created in order to remove self-contacting and self-intersecting in the mesh. For example, for a node inside a region of a contact region pair, the node may be projected onto the other region of the contact region pair and the move vector of the node may be calculated based on the projection vector (as a result of the projection) and the normal at the node. As another example, for a node of a triangle in an intersecting triangle pair, the move vector of the node may be calculated based on the normal of the other triangle (e.g., a vector perpendicular to the tangent plane of the other triangle) and the move distance may be calculated.

Using the move vector and move distance, nodes may be moved to remove self-contact and self-intersection instances. The process of calculating move vectors and move distances are described in greater detail with reference to FIGS. 9A-B (illustrating an example move node process) and FIG. 10 (a flow chart describing the calculation process in further detail).

The local modification process may generally include various mesh editing techniques. For example, via the local modification process, edges of triangles may be swapped (e.g., swapping edges between two triangles of a triangle pair), edges of triangles may be split (e.g., for an edge contact scenario as described above, the edge may be split to avoid the scenario), edges of triangles may be collapsed, or other local mesh re-configuration and refinement steps may be taken.

The Boolean operation process may generally include the modification of triangles in contact region pairs. Using the Boolean operation process, two regions in the contact region pair are replaced in the mesh by two mid-regions that are formed by connecting the mid-points of two corresponding points in the two regions of the contact region pair. Such a process is described in greater detail in FIG. 11.

Fix system 116 may further be configured to determine which of the processes to use to fix the self-contact and self-intersection instances in the model. For example, the local modification process may be used if the move node process is insufficient. Further, if a contact region is more than two element layers deep inside the other contact region in a contact region pair, the move node process may produce distorted elements, so the Boolean operation process may be used instead.

As a result of subsystems 110-116 of self-contact and self-intersection system 104, self-contact and self-intersection instances may be removed from the model being created using FEM system 102. FEM system 102 is further shown to include a tet mesh system 118 configured to create a tetrahedral mesh of the model for analysis and use (once the intersecting and contacting elements of the mesh are fixed by system 104 and re-meshed).

Figure 2:
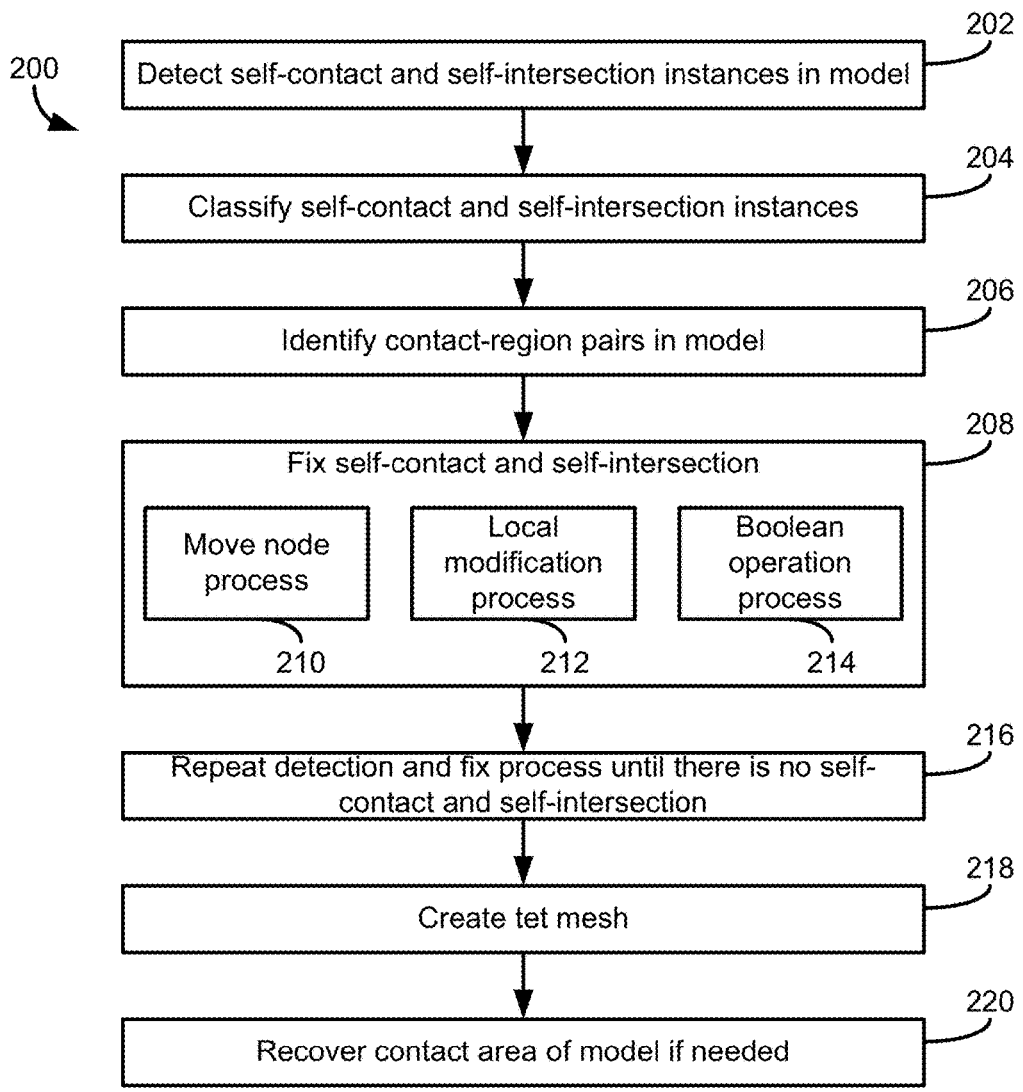
FIG. 2 is a flow chart of a process of identifying and fixing self-contact and self-intersection instances in a model, according to an exemplary embodiment.

Referring now to FIG. 2, a flow chart of a process 200 of identifying and fixing self-contact and self-intersection instances in a model is shown. Process 200 may be executed by FEM system 102 and more particularly self-contact and self-intersection system 104 shown in FIG. 1.

Process 200 includes detecting self-contact and self-intersection instances in a mesh of a model (step 202). Step 202 may be performed by, for example, detection system 110 of FIG. 1. Step 202 may generally include the formation of a data structure (e.g., an octree data structure described above), insertion of triangle and mesh data in the data structure, and the identification of self-contact and self-intersection instances using the data structure and triangle and mesh information. Step 202 is described in greater detail in FIG. 5.

Process 200 further includes classifying self-contact and self-intersection instances (step 204). Step 204 may generally include classifying the instances based on the parts of the mesh doing the intersecting (e.g., a single point, a line segment, an edge, an area, a whole triangle, etc.). Step 204 may be performed by, for example, classification system 112 of FIG. 1.

Process 200 further includes identifying contact region pairs in the model (step 206). Step 206 may generally include the identification of regions in the model in which there are self-contact and self-intersection instances. Step 206 may be performed by, for example, contact region pair identification system 114 of FIG. 1.

Process 200 further includes fixing self-contact and self-intersection meshes (step 208). Step 208 may be performed by, for example, fix system 116 of FIG. 1. The fixing may include the execution of one or more processes such as a move node process (step 210, shown in greater detail in FIG. 10), a local mesh modification process (step 212), and a Boolean operation process (step 214, shown in greater detail in FIG. 11).

The detection and fix process may be repeated until there are no more self-contacting and self-intersecting meshes (step 216). For example, after the completion of step 208, the detection step 202 may be repeated, until there are no more intersections or contacts in the mesh. If there are multiple iterations, other methods may be used. For example, if the move node process did not work in a first iteration of process 200, a local mesh modification process may then be used. A moving distance or move vector of a node may be adjusted if an adjustment during a previous iteration of process 200 did not work.

When the self-contact and self-intersection instances are removed, a tet mesh may then be created (step 218), and analysis on the model may be run. If the contact area of the model needs to be recovered, (e.g., the self-contact and self-intersection instances in the model need to be kept in the model), then the area may be recovered (step 220). In some applications, the self-contact and self-intersection instances do not need to be kept in the final model, and therefore can be removed. However, in some applications, it may be desirable to have the self-contact and self-intersection instances in the final model. In such a case, the nodes may be moved back to their original positions. If there are bad tetrahedral elements or inverted tetrahedral elements after the move, they may be fixed at step 220.

Referring generally to FIGS. 3-15, the subsystems of FEM system 102 and process 200 are described in greater detail.

Referring to FIGS. 3A-B, an example of a self-contact mesh in a model is shown in greater detail. Model 300 is shown with a self-contact instance 302 in the model. A self-contact instance in a mesh of the model may occur when the surface of two different triangles in the tri-mesh of the model are in contact with one another. Referring more particularly to FIG. 3B, the self-contact is shown in greater detail.

Referring to FIGS. 4A-B, an example of a self-intersection mesh in a model is shown in greater detail. The model includes two separate portions 400, 402, and the two portions create a self-intersection instance 404 in the model. A self-intersection instance in a mesh of the model may occur when one or more points, edges, or surfaces of a triangle in the mesh of the model intersect with another point, edge, or surface of another triangle of the mesh. For example, referring particularly to FIG. 4B, several edges and vertices of triangles in portion 400 are shown penetrating the area of portion 402.

Referring now to FIG. 5, a detailed flow chart of a process 500 for using an octree data structure in a self-contact and self-intersection detection step is shown, according to an exemplary embodiment. Process 500 may be executed by, for example, detection system 110 of FIG. 1.

Process 500 includes building an octree data structure and insert mesh information into the octree (step 502). The mesh information may include the location of edges or vertices of triangles in the tri-mesh, or any other information that describes the tri-mesh of the model.

As described above, an octree data structure is a data structure in which each node of the octree has exactly eight children or sub-nodes. Octrees partition a three-dimensional space into eight octants. For example, for a three-dimensional model with a tri-mesh, the model may be partitioned into eight separate parts based on the edges and vertices of the triangles in the tri-mesh of the model over and over. By using the octree data structure, the number of triangle pairs that need to be checked for an intersection is reduced. The result of the octree data structure is a list of tri-mesh elements for which intersecting elements can be tested for and found. As described above, other data structures than an octree data structure may alternatively be used at step 502 for building the data structure and inserting mesh information in the structure.

Process 500 further includes detecting intersecting triangle pairs (step 504). For each node (e.g., where each node may represent a triangle in the tri-mesh of the model) in the octree, step 504 may include checking if the triangle intersects with the triangles in the same node of the octree or in adjacent nodes of the octree (e.g., triangles in nodes who share the same parent node with the triangle). As a result of step 504, process 500 may establish a list of intersecting triangle pairs.

For each intersecting triangle pair, vertices, edges, and regions of the intersection region of the intersecting triangle pair may be identified (step 506). The intersecting area of an intersecting triangle pair may be a single point, a single edge, a triangle, quadrilateral, another polygonal shape, or any other type of intersection.

Referring also to FIG. 6, types of intersections that may be detected at step 506 are shown in greater detail. Intersection 600 is shown as a vertex or point intersection, where a vertex of one triangle 602 is shown intersecting with a point of another triangle 604. Such an intersection may be between vertices, non-vertex points, or a combination of the two. Intersection 610 is shown as an edge intersection, where an edge of one triangle 612 intersects with a line segment (or edge) of another triangle 614. Intersection 620 is shown as a triangle intersection. One triangle 622 intersects with another triangle 624, and the resulting area of intersection forms a triangular area 626. Intersection 630 is shown as a quadrilateral intersection. One triangle 632 intersects with another triangle 634, and the resulting area of intersection forms a quadrilateral area 636. Further, intersections 640, 650 illustrate an intersection resulting in a pentagonal area 646 and hexagonal area 656, respectively. Triangles 642, 644 create an pentagonal intersection area, and triangles 652, 654 create a hexagonal intersection area.

Referring again to FIG. 5, for each vertex and edge of the intersection region, the positions of the vertices and edges on the triangles in the intersecting triangle pair may be identified (step 508). As illustrated in FIG. 6, a vertex of the intersection region may be a vertex of a triangle (e.g., triangle 602 of intersection 600), an interior point on a triangle edge (e.g., triangle 604 of intersection 600), or an interior point inside a triangle. An edge of the intersection region may be a boundary edge of a triangle (e.g., triangle 612 of intersection 610), a boundary segment of a triangle (e.g., triangle 614 of intersection 610), or an interior segment of a triangle. Such information about the edges or vertices may be used for classification and fixing of the intersection.

For each triangle in an intersecting triangle pair, the triangle normal and triangle vertex distances may be calculated (step 510). The triangle normal is a vector perpendicular to the tangent plane of the triangle. The calculated data may be stored in a triangle pair data structure (e.g., a data structure that includes all relevant information about two triangles that intersect) that may be stored and used in classification and fix processes. Process 500 may further include organizing the triangle pairs (e.g., the triangle pair data structures) in a sorted list (step 512) for faster data retrieval in other steps of the finite element method.

Referring to FIG. 7, various types of interior segments of an edge contact intersection instance in a model are shown. Referring also to classification system 112, an edge contact is described as a classification or type of intersection that may be determined by system 112. The edge contact may include an interior segment. The interior segment may be a line segment of a tri-mesh that intersects with a surface area of a different tri-mesh. FIG. 7 illustrates types of interior segment intersections.

For example, referring to intersection 700, interior segment 702 is shown as a segment in which one endpoint of the interior segment is located at a vertex of the triangle and the other endpoint is located on a boundary edge on the triangle. Intersection 710 shows an interior segment 712 in which one endpoint is located at a vertex but the other endpoint is located on an interior point of the triangle. Intersection 720 shows an interior segment 722 in which both endpoints are located on different boundary edges of the triangle. Intersection 730 shows an interior segment 732 in which one endpoint is on a boundary edge of the triangle but the other endpoint is located on an interior point of the triangle. Intersection 740 shown an interior segment 742 in which both endpoints are located at different interior points of the triangle. The intersections shown in FIG. 7 are provided as examples of potential edge contact intersections in a triangle; in other embodiments, other such edge contacts may be possible.

Referring to FIG. 8, a folded contact example of a self-contact instance in a model is shown. As described with reference to classification system 112, the folded contact example (at locations 802, 804 in model 800) may be identified by classification system 112. This classification may be made using, for example, information stored in a triangle pair data structure at step 510 of process 500. In a folded contact scenario, the two triangles have an opposite normal and are parallel to one another.

Figure 9A:
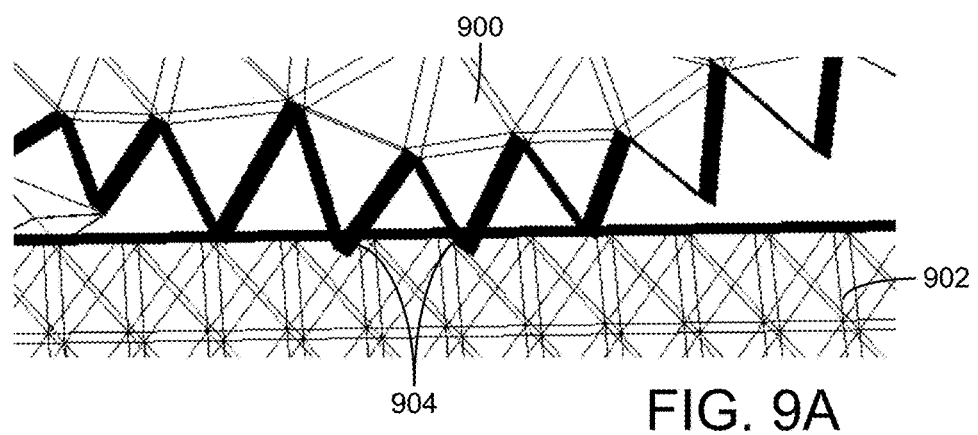
FIGS. 9A-B illustrate a move node process of fixing a self-intersection instance in a model, according to an exemplary embodiment.
Figure 9B:
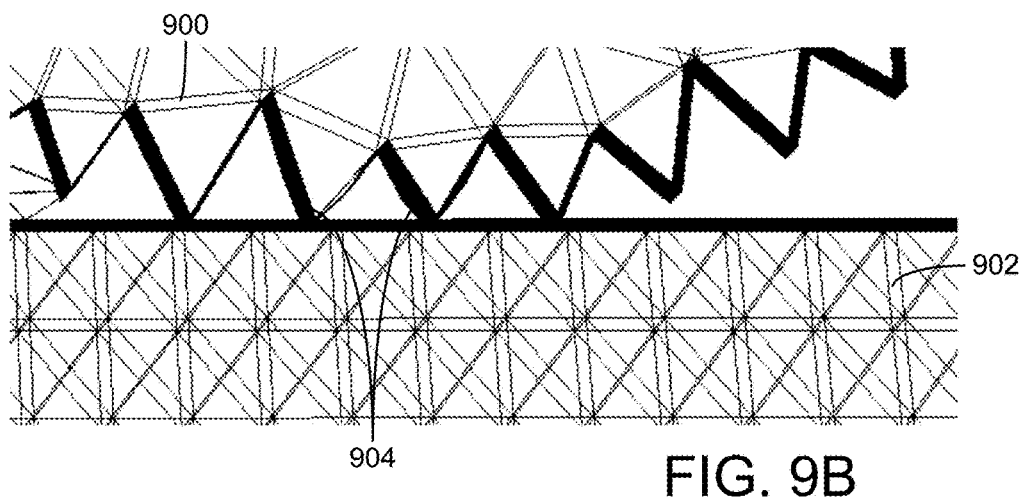
Figure 10:
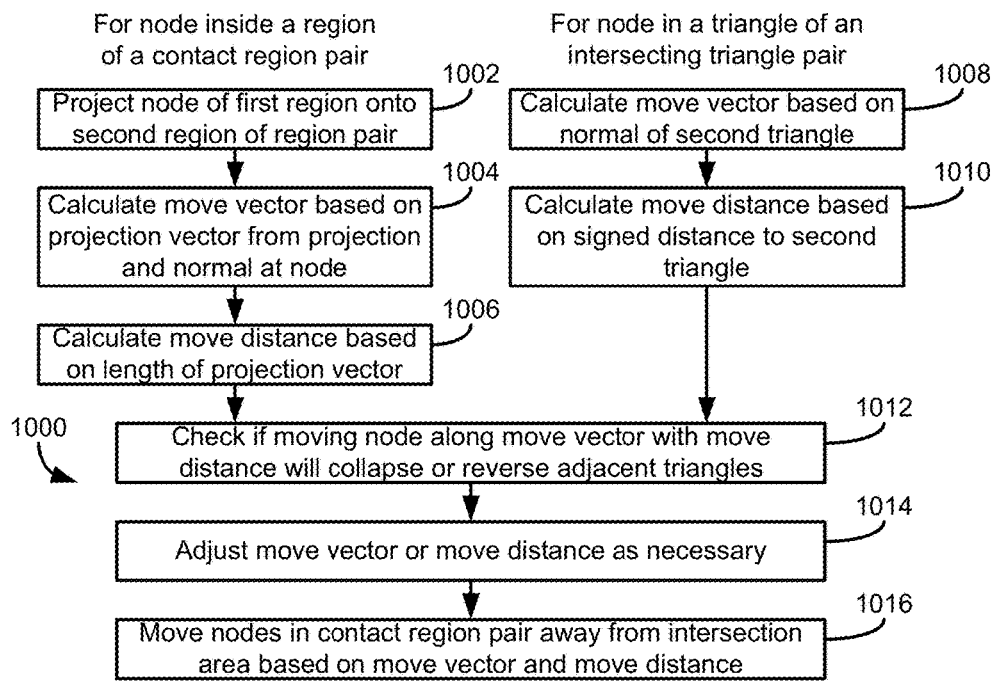
FIG. 10 is a flow chart of a move node process for fixing self-contact and self-intersection instances in a model, according to an exemplary embodiment.

Referring to FIGS. 9A-B, a move node process of fixing a self-intersection instance in a mode is illustrated. Referring also to FIG. 10, a flow chart of a move node process 1000 for fixing self-contact and self-intersection instances in a model is shown, according to an exemplary embodiment. Move node process 1000 may be executed when a node needs to be moved in order to fix a self-contact or self-intersection instance in a mesh of a model. Move node process 1000 may generally include moving nodes inside a region of a contact region pair and/or moving a node in a triangle of an intersecting triangle pair. While process 1000 is illustrated as including both types of fixes, it should be understood that process 1000 may include the execution of some or all of the steps as illustrated.

Process 1000 includes steps 1002-1006 for moving a node inside a region of contact region pair. For each node inside one of the regions, the node may be projected onto the other region of the contact region pair (step 1002). A move vector may then be calculated based on the projection vector from the projection of step 1002 and the normal at the node (step 1004). The move distance may then be calculated based on the length of the projection vector (step 1006). As a result of steps 1002-1006, a move vector and move distance may be calculated that describes the movement of the node that should occur in order to remove the self-intersection instance in the mesh.

Process 1000 includes steps 1008-1010 for moving a node in a triangle of an intersecting triangle pair. A move vector may be calculated for each node of a first triangle based on the normal of the second triangle (step 1008). A move distance may then be calculated based on the signed distance to the second triangle (step 1010). The signed distance may simply be a distance with a positive or negative value indicative of a direction.

If a node is in more than one intersecting triangle pair, then its move vector may be calculated at step 1008 for each intersecting triangle pair. The move vector of the node may then be calculated as the mean vector of all move vectors for each pair. Then, to calculate its move distance at step 1010, the move vector of the node for each intersecting triangle pair may be projected onto its mean vector direction. The move distance is then the maximal length of all projection vectors. In other words, each node may be projected in a direction based on its individual move vector, and the maximum resultant projection vector across all projections is used as the move distance for the node. The move vector may further be adjusted at corner and ridge areas of the mesh of the model, if necessary.

As a result of steps 1002-1010, a move vector and move distance is known for each node whose position should change as part of a move node process. Process 1000 further includes checking if moving the node along the move vector with the move distance will collapse or reverse adjacent triangles (step 1012). For example, the movement of a node may impact the triangles that make up the tri-mesh of the model. If so, then the move vector or move distance may be adjusted as necessary (step 1014) in order to keep the model stable.

Process 1000 further includes moving the nodes in the contact region pair away from the intersection instance based on the move vector and move distance (step 1016). This movement should remove the self-intersection or self-contact instance in the model.

Figure 11:
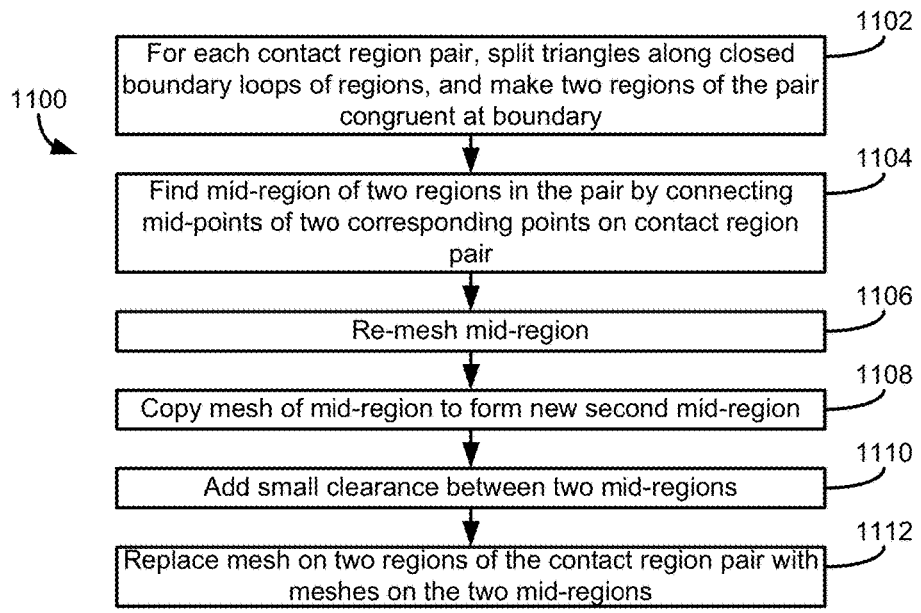
FIG. 11 is a flow chart of a Boolean operation process for fixing self-contact and self-intersection instances in a model, according to an exemplary embodiment.

Referring now to FIG. 11, a flow chart of a Boolean operation process 1100 for fixing self-contact and self-intersection instances in a model is shown. Process 1100 may generally include the modification of triangles in contact region pairs as described above. Process 1100 may result in the formation of new regions in a mesh of a model that replace the two regions that make up the contact region pair. The formation of these new regions may result in a removal of a self-contact or self-intersection instance in a mesh of a model.

Process 1100 includes, for each contact region pair, splitting triangles along the closed boundary loops of the regions, and making the two regions of the contact region pair congruent at the boundary (step 1102). After the splitting of the triangles, the two contact regions in the contact region pair have the same boundary.

A mid-region of the two regions may be found by connecting mid-points of two corresponding points on the contact region pair (step 1104). For example, for each region in the region pair, a mid-point may be found and the mid-points may be connected together. The resulting region around the connection may be defined as the mid-region of the contact region pair.

The mid-region may then be re-meshed (step 1106). This may create a new tri-mesh. The mesh of the mid-region may then be coped to form a new second mid-region (step 1108). A small clearance may then be added between the two mid-regions (step 1110). In other words, after the re-meshing of the first mid-region and the creation of the second mid-region, the mid-regions may be placed next to each other by the FEM system with a small gap in between the mid-regions to avoid an intersection or contact between the two mid-regions. Then, the two mid-regions may replace the mesh of the two original regions of the contact region pair (step 1112). The result may be a replacement of the original contact region pair (with a self-contact or self-intersection instance) with two new regions that do not have a self-contact or self-intersection instance).

Figure 12A:
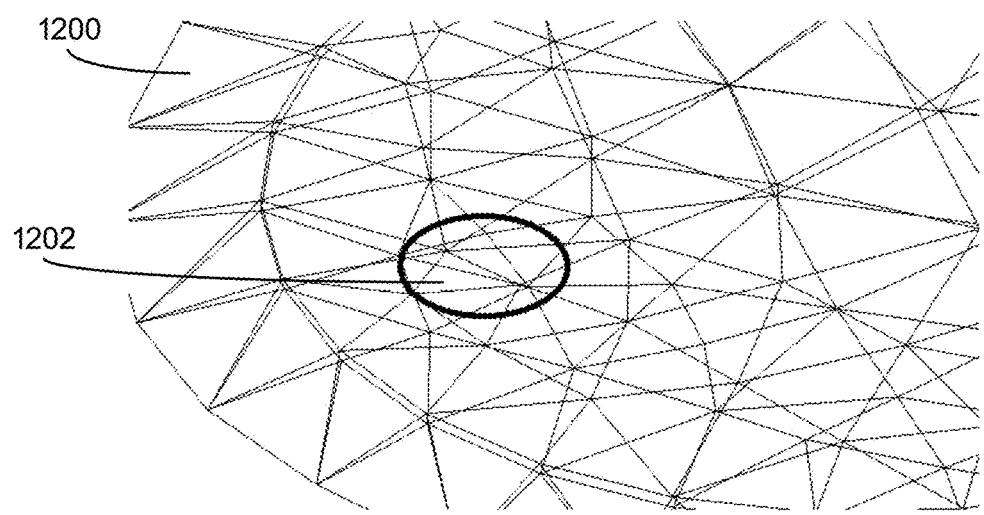
FIGS. 12A-B illustrate an example fix of a self-intersection mesh in a model, according to an exemplary embodiment.
Figure 12B:
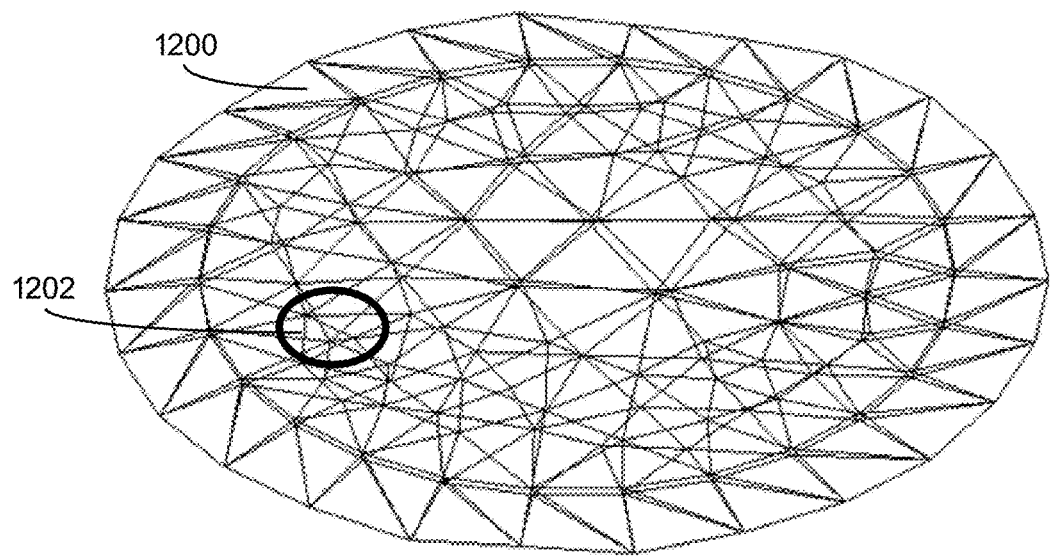

FIGS. 12A-B illustrate an example fix of a self-intersection mesh in a model, according to an exemplary embodiment. In FIG. 12A, a model 1200 with a self-intersection area 1202 is shown. In FIG. 12B, the intersection area 1202 is shown with the intersecting meshes removed. In FIGS. 12A-B, the removal of the intersection may be accomplished by a move node process or by a local modification process. The intersections in FIGS. 12A-B are shown generally as point or edge intersections, where points and edges intersect with other points and edges in the model. The system and methods described herein, and more particularly classification system 112, may identify and classify the intersections as a vertex-to-vertex intersection, vertex-to-edge intersection, or otherwise.

Figure 13A:
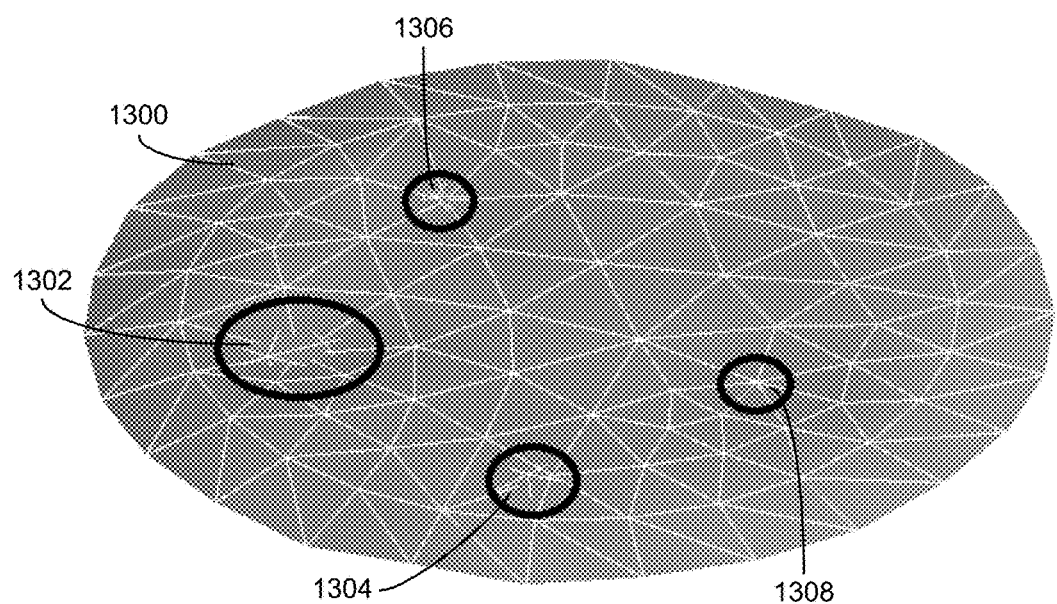
FIGS. 13A-B illustrate another example fix of a self-intersection mesh in a model, according to an exemplary embodiment.
Figure 13B:
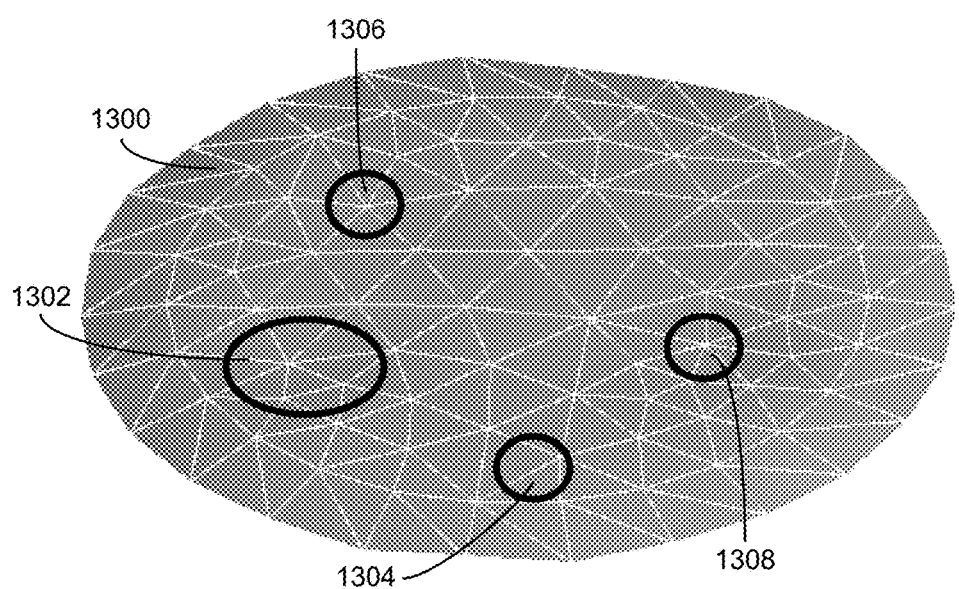

FIGS. 13A-B illustrate another example fix of a self-intersection mesh in a model, according to an exemplary embodiment. In FIG. 13A, a model 1300 is shown with several intersection areas 1302, 1304, 1306, 1308. In FIG. 13B, intersection areas 1302, 1304, 1306, 1308 are shown fixed, with the intersections replaced by a tri-mesh with no intersections. Intersection areas 1302, 1304, 1306, 1308 in FIG. 13B are shown as various types of intersections. For example, intersection area 1302 may be a area contact type or penetration type, where the intersection area is polygonal or lies on both sides of a triangle.

Figure 14:
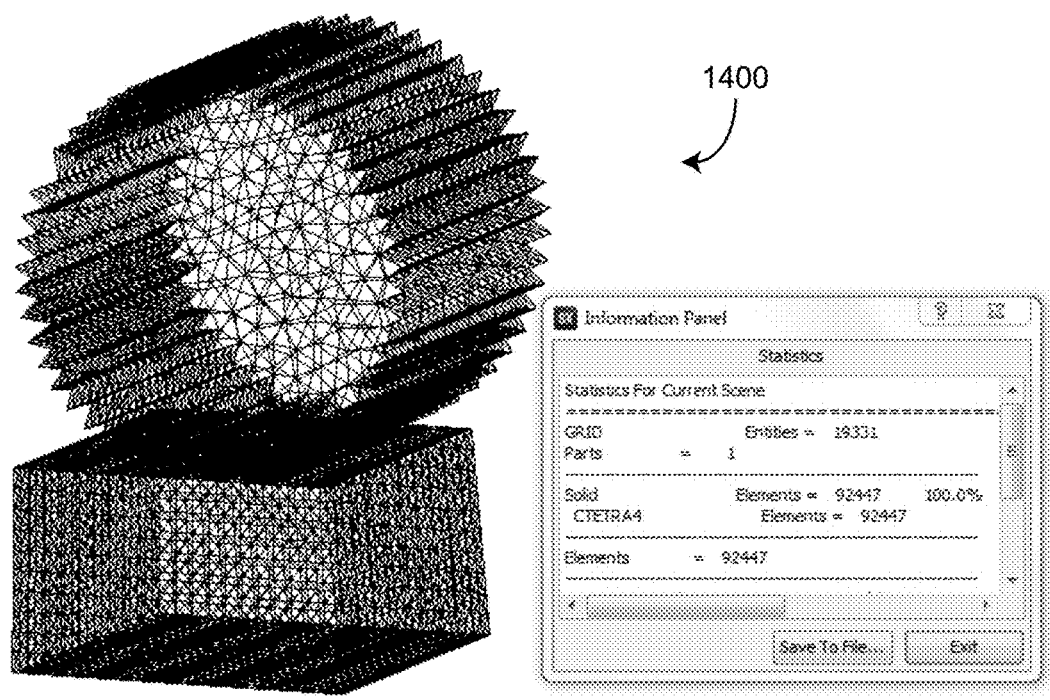
FIG. 14 illustrates the creation of a tet mesh after the self-contact and self-intersection instances are removed from the model, according to an exemplary embodiment.

Referring now to FIG. 14, a screenshot 1400 of a FEM system showing the creation of a tet mesh is shown. After the removal of self-contact and self-intersection instances in the model, a tet mesh system 118 or other system may create a tetrahedral mesh of the model and perform analysis on the model as shown. Screenshot 1400 may be provided to user of the FEM system as described in the present disclosure.

Figure 15:
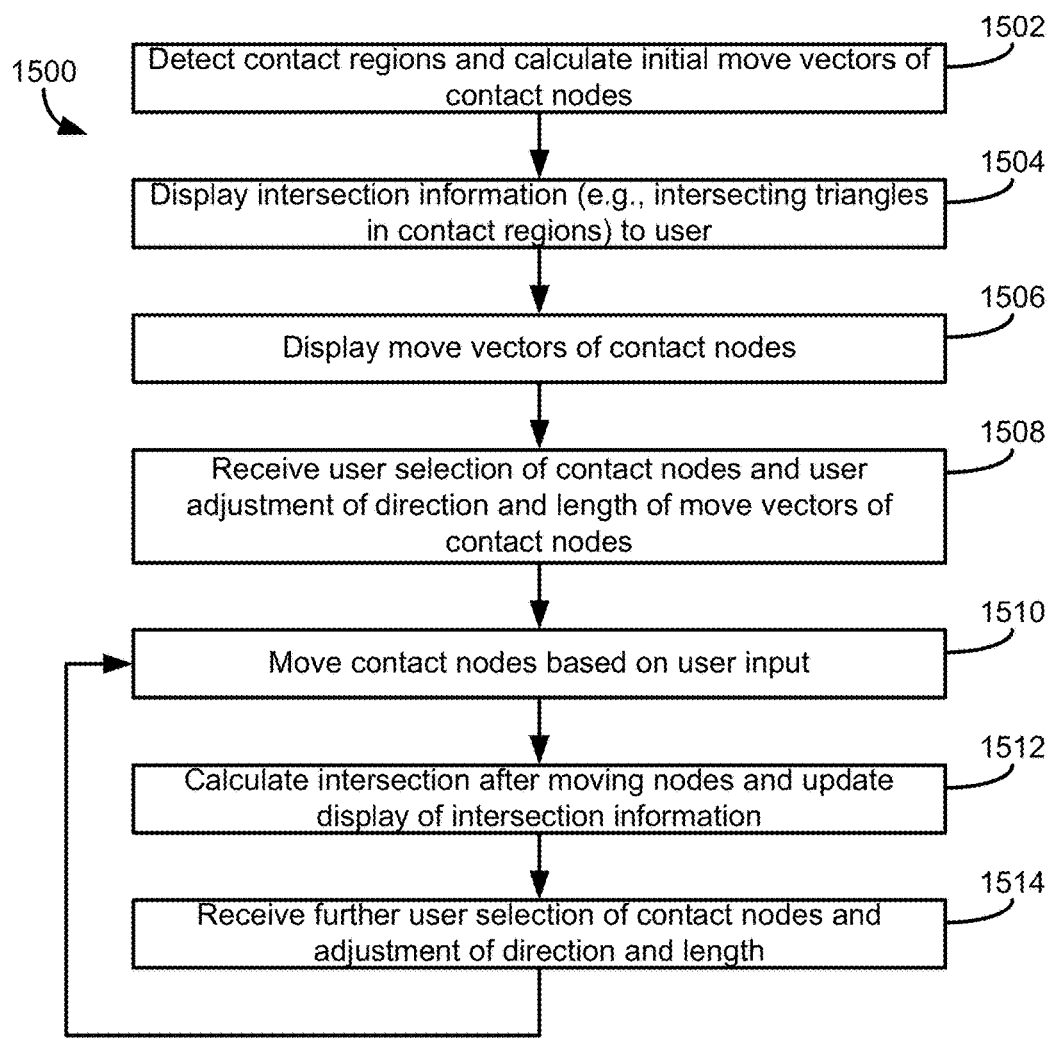
FIG. 15 is a flow chart of a process describing user interaction with the self-contact or self-intersection detection and fixing process, according to an exemplary embodiment.

Referring now to FIG. 15, a flow chart of a process 1500 describing user interaction with the self-contact or self-intersection detection and fixing process is shown, according to an exemplary embodiment. The systems and methods described in the present disclosure may be used to detect and fix self-contact and self-intersection instances in a model. These systems and methods may be used automatically (e.g., when the model is built for testing and analysis) as described. In other words, the process may not be visible to a user. For example, calculations of move vectors of nodes and the actual moving of the nodes in the model may be done automatically without user interaction. In another embodiment, the systems and methods herein may be used upon user request or another initiation step. For, the systems and methods herein may be used as part of an interactive system tool which allows a user to have input in how self-contact and self-intersection instances are fixed. In the example process 1500 of FIG. 15, a user may provide a user input as part of a method that uses a move node process to fix a self-intersection instance in a model. Process 1500 utilizes both an automatic calculation of move vectors and a user input (e.g., a selection of move vectors and/or nodes) to fix the self-intersection instance.

Process 1500 includes detecting contact regions and calculate an initial move vector of contact nodes in the contact regions (step 1502). Step 1502 may be executed by the systems and methods as described above. Process 1500 then includes displaying intersection information to a user of the system (step 1504). For example, displaying intersection information may include displaying the intersecting triangles in the contact regions graphically using a software product. The intersection information may be displayed on, for example, display device 126 of FIG. 1. Step 1504 may include enhancing the view of the intersecting triangles. For example, the triangles or portions thereof may be colored or otherwise highlighted on the screen for the user.

Process 1500 further includes displaying the move vectors of the contact nodes on the screen for the user (step 1506). The move vectors may be displayed by listing the move vectors in a window similar to the one shown in FIG. 14, may be displayed next to the nodes shown graphically in the display, or otherwise.

Process 1500 further includes receiving a user selection of contact nodes and a user adjustment of direction and length of the move vectors of the contact nodes (step 1508). When the intersection information including the triangles and nodes are displayed to the user, the software may make the nodes and move vectors of the nodes selectable. A user may select a node and adjust the move vectors of the nodes calculated at step 1502. The adjustment of the move vector may be the direction of the move vector (e.g., the direction in which a node should be moved to fix an intersection) and/or the length of the move vector (e.g., the distance in which the node should be moved). The contact nodes may then be moved based on the user input (step 1510).

Process 1500 may then include calculating intersections after moving the nodes based on the user input, and updating the display of the intersection information (step 1512). The display update may reflect if an intersection was removed or not based on the user inputted move vector. For example, a color or other display property of a triangle may be updated on the display based on if the intersection was fixed or not.

The user may further continue to select contact nodes and adjust the direction and length of the corresponding move vectors (step 1514). Process 1500 may repeat for more than one iteration through steps 1510-1514 as the user continues to adjust nodes in the model. Process 1500 therefore allows a user of the system to adjust nodes manually after receiving information from the system about suggested movement of the nodes.

Configurations of Various Exemplary Embodiments

The terms "system", "logic", "data processing apparatus" or "computing device" encompasses all kinds of circuits, apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, networked systems or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. The machine-executable instructions may be executed on any type of computing device (e.g., computer, laptop, etc.) or may be embedded on any type of electronic device (e.g., a portable storage device such as a flash drive, etc.).

Although the figures may show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for a computerized Finite Element Method (FEM) system, a Computer-Aided Design (CAD) system, or a Computer-Aided Engineering (CAE) system to fix a contact region, comprising:
   detecting the contact region within a simulated model, wherein detecting the contact region comprises grouping into the contact region, triangles that intersect with other triangles;
   determining a classification of the contact region in the model;
   selecting at least one of fixing the contact region by moving a node in the contact region, fixing the contact region by local modification, or fixing the contact region by Boolean operation;
   wherein fixing the contact region by the Boolean operation comprises fixing the contact region by the Boolean operation in response to determining that the contact region is more than two element layers deep inside another contact region;
   fixing, based on the classification determined, the contact region by a selected one of fixing the contact region by moving the node in the contact region, fixing the contact region by the local modification, or fixing the contact region by the Boolean operation; and
   creating a tetrahedral mesh after fixing the contact region.

2. The method of claim 1, wherein detecting the contact region comprises:
   building the octree data structure and inserting mesh information into the octree data structure;
   detecting intersecting triangle pairs based on the octree data structure, wherein each intersecting triangle pair of the intersecting triangle pairs comprises one of the triangles and one of the other triangles;
   identifying properties of the intersecting triangle pairs;
   calculating, for each intersecting triangle pair, triangle normal and triangle vertex distance; and
   organizing and sorting the triangle pairs; and
   grouping the triangles into the contact region and the other triangles into another contact region.

3. The method of claim 2, wherein the contact region is fixed by moving the node by projecting the node onto other regions of the intersecting triangle pairs based on a projection vector.

4. The method of claim 3, wherein moving the node further comprises calculating a move vector based on the projection vector and the normal at the node.

5. The method of claim 4, wherein moving the node further comprises calculating the move distance based on a length of the projection vector.

6. The method of claim 1, wherein the contact region is fixed by the local modification, the local modification comprises at least one of swapping edges of the triangles, splitting edges of the triangles, collapsing edges of the triangles, and local mesh re-configuration and refinement.

7. The method of claim 1, wherein the Boolean operation comprises:
   splitting each triangle of an intersecting triangle pair along closed boundary loops of contact regions formed by the intersecting triangle pair, and making the contact regions of the intersecting triangle pair congruent at a boundary of the contact regions.

8. The method of claim 7, further comprising connecting mid-points of two corresponding points in the contact regions.

9. The method of claim 7, wherein the contact regions share the boundary in response to each triangle of the intersecting triangle pair being split.

10. The method of claim 1, wherein
    at least one of the triangles in the contact region intersects with one of the other triangles in another contact region; or
    at least one of the triangles in the contact region is completely inside another contact region.

11. The method of claim 1, wherein moving the node in the contact region comprises:
    determining a move vector of the node; and
    adjusting the move vector based on a move vector of at least one adjacent node in the contact region.

12. The method of claim 1, further comprising identifying a contact region pair including the contact region and another contact region, wherein the other triangles are grouped as the another contact region, and wherein identifying the contact region pair is based on the classification.

13. A non-transitory computer readable medium of a computerized Finite Element Method (FEM) system, a Computer-Aided Design (CAD) system, or a Computer-Aided Engineering (CAE) system containing program instructions, wherein execution of the program instructions by one or more processors of a computer system causes the one or more processors to:
    detect a contact region within a simulated model, wherein detecting the contact region comprises grouping into the contact region, triangles that intersect with other triangles;
    determine a classification of the contact region in the model;
    select at least one of fixing the contact region by moving a node in the contact region, fixing the contact region by local modification, or fixing the contact region by Boolean operation;
    wherein fixing the contact region by the Boolean operation comprises fixing the contact region by the Boolean operation in response to determining that the contact region is more than two element layers deep inside another contact region;
    fix, based on the classification determined, the contact region by a selected one of fixing the contact region by moving the node in the contact region, fixing the contact region by the local modification, or fixing the contact region by the Boolean operation; and
    create a tetrahedral mesh after fixing the contact region.

14. The non-transitory computer readable storage medium of claim 13, further comprising:
    calculating move vectors of contact nodes in the contact region of the model based on the classification; and
    moving the contact nodes automatically without user-interaction based on the classification, wherein the move-vector can be applied to an interactive self-contact and self-intersection fix tool which utilizes both automatic calculation and user-input to fix the contact on the model.

15. The non-transitory computer readable storage medium of claim 14, wherein the one or more processors are further caused to calculate initial move-vectors of the contact nodes.

16. The non-transitory computer readable storage medium of claim 14, wherein intersecting triangles in contact region are shown graphically by coloring the intersecting triangles on a display device.

17. The non-transitory computer readable storage medium of claim 16, wherein the contact nodes are selectable by a user for adjusting the directions and/or lengths of the move-vectors of the contact nodes on a screen.

18. The non-transitory computer readable storage medium of claim 17, wherein the contact nodes are based on user-input;
further comprising calculating an intersection after moving the contact nodes;
wherein the color of the intersecting triangles is updated based on the intersection being fixed.

19. The non-transitory computer readable storage medium of claim 18, wherein the one or more processors are further caused to pick remaining contact nodes, adjust the move-vectors, and move the contact nodes again until all self-contacts are fixed.

20. The non-transitory computer readable storage medium of claim 14, wherein the move-vectors of contact nodes are displayed on a screen.

21. A computerized Finite Element Method (FEM) system, a Computer-Aided Design (CAD) system, or a Computer-Aided Engineering (CAE) system, comprising:
a memory;
a processor, wherein the processor is configured to:
detect a contact region within a simulated model, wherein detecting the contact region comprises grouping into the contact region, triangles that intersect with other triangles;
determine a classification of the contact region in the model;
select at least one of fixing the contact region by moving a node in the contact region, fixing the contact region by local modification, or fixing the contact region by Boolean operation;
wherein fixing the contact region by the Boolean operation comprises fixing the contact region by the Boolean operation in response to determining that the contact region is more than two element layers deep inside another contact region;
fix, based on the classification determined, the contact region by a selected one of fixing the contact region by moving the node in the contact region, fixing the contact region by the local modification, or fixing the contact region by the Boolean operation; and
create a tetrahedral mesh after fixing the contact region.

* * * * *